United States Patent
Kim

(10) Patent No.: US 8,573,897 B2
(45) Date of Patent: Nov. 5, 2013

(54) DOUBLE SIDES CUTTING INSERT AND CUTTING TOOL WITH THE SAME

(75) Inventor: Hee Seok Kim, Daegu (KR)

(73) Assignee: TaeguTec, Ltd., Dalseong-Gun, Daegu (KR)

( * ) Notice: Subject to any disclaimer, the term of this patent is extended or adjusted under 35 U.S.C. 154(b) by 206 days.

(21) Appl. No.: 13/131,525

(22) PCT Filed: Nov. 27, 2008

(86) PCT No.: PCT/KR2008/007003
§ 371 (c)(1), (2), (4) Date: May 26, 2011

(87) PCT Pub. No.: WO2010/061988
PCT Pub. Date: Jun. 3, 2010

(65) Prior Publication Data
US 2011/0243672 A1 Oct. 6, 2011

(51) Int. Cl.
*B23C 5/20* (2006.01)

(52) U.S. Cl.
USPC .................. 407/42; 407/53; 407/62

(58) Field of Classification Search
USPC .............. 407/53, 54, 113, 34, 62, 48
See application file for complete search history.

(56) References Cited

U.S. PATENT DOCUMENTS

| | | | | |
|---|---|---|---|---|
| 4,588,331 A | * | 5/1986 | Yoshinori | 407/36 |
| 4,898,499 A | * | 2/1990 | Tsujimura et al. | 407/42 |
| 5,017,055 A | | 5/1991 | Tsujimura et al. | |
| 5,441,370 A | * | 8/1995 | Pantzar et al. | 407/113 |
| 5,562,370 A | * | 10/1996 | Vogel et al. | 407/42 |
| 5,622,460 A | | 4/1997 | Satran et al. | |
| 5,762,453 A | * | 6/1998 | Arai et al. | 407/113 |
| 6,135,677 A | * | 10/2000 | Fijimoto et al. | 407/42 |
| 6,149,355 A | * | 11/2000 | Fouquer et al. | 407/113 |
| 6,213,691 B1 | * | 4/2001 | Leeb | 407/34 |
| 6,543,970 B1 | | 4/2003 | Qvarth et al. | |
| 7,309,193 B2 | * | 12/2007 | Riviere et al. | 407/113 |
| 7,510,353 B2 | * | 3/2009 | Kramer | 407/113 |

(Continued)

FOREIGN PATENT DOCUMENTS

| | | | |
|---|---|---|---|
| DE | 3807165 A1 | * | 9/1988 |
| EP | 123887 A2 | * | 11/1984 |

(Continued)

OTHER PUBLICATIONS

Official Action dated Oct. 8, 2012 issued in Korean counterpart application (No. 10-2011-7012218).

(Continued)

*Primary Examiner* — Daniel Howell
*Assistant Examiner* — Nicole N Ramos
(74) *Attorney, Agent, or Firm* — Womble Carlyle

(57) ABSTRACT

A cutting tool includes a tool body and at least one double-sided cutting insert mounted in an insert pocket of the tool body. The at least one double-sided cutting insert includes: an elliptical top surface; an elliptical bottom surface; first and second side surfaces connecting between both side ends of the top and bottom surfaces, respectively; a pair of corners connecting between both side ends of the first and second side surfaces, respectively; first and second cutting edges formed at a boundary portion between the top surface and the first side surface and a boundary portion between the bottom side surface and the second side surface and having a curved shape, respectively.

25 Claims, 10 Drawing Sheets

(56) References Cited

U.S. PATENT DOCUMENTS

| | | | |
|---|---|---|---|
| 7,905,688 B2 * | 3/2011 | Ertl et al. | 407/42 |
| 8,066,454 B2 * | 11/2011 | Riviere et al. | 407/40 |
| 2002/0159846 A1 | 10/2002 | Horiike et al. | |
| 2005/0169716 A1 | 8/2005 | Smilovici et al. | |
| 2008/0118314 A1 | 5/2008 | Lehto et al. | |
| 2010/0124465 A1 | 5/2010 | Morrison et al. | |

FOREIGN PATENT DOCUMENTS

| | | | |
|---|---|---|---|
| EP | 577011 A1 * | 1/1994 | |
| EP | 813926 A1 * | 12/1997 | |
| EP | 1002608 A2 | 5/2000 | |
| JP | 60-099512 A | 6/1985 | |
| JP | 60099512 A * | 6/1985 | |
| JP | H05-67414 | 7/1993 | |
| JP | 08290316 A * | 11/1996 | |
| JP | 2002283119 A * | 10/2002 | |
| JP | 2006326755 A * | 12/2006 | |
| KR | 1995-001371 Y1 | 3/1995 | |
| WO | WO 95/17284 | 6/1995 | |

OTHER PUBLICATIONS

International Search Report in PCT/KR2008/007003, dated Jul. 27, 2009.
Written Opinion in PCT/KR2008/007003, dated Jul. 27, 2009.
Official Action dated Oct. 15, 2012 issued in Chinese counterpart application (No. 200880132188.8).
Official Action dated Oct. 16, 2012 issued in Japanese counterpart application (No. 2011-537341).

* cited by examiner

DOUBLE SIDES CUTTING INSERT AND CUTTING TOOL WITH THE SAME

RELATED APPLICATIONS

This is a 35 USC 371 U.S. National Phase of International Application No. PCT/KR2008/007003, filed 27 Nov. 2008 and published in English as WO 2010/061988A1 on 3 Jun. 2010. The contents of the aforementioned application is incorporated by reference in its entirety.

TECHNICAL FIELD

The present invention generally relates to a double-sided cutting insert and a cutting tool using the same, and more particularly to a ball nose end mill using the double-sided cutting insert.

BACKGROUND ART

A ball nose end mill is typically used to cut curved surfaces. It is divided into two classes depending on whether there is a cutting insert, i.e., a solid ball nose end mill in which a ball nose portion is integrated with an end mill body and an indexable ball nose end mill wherein a cutting insert is releasibly mounted on an end mill body.

In the indexable ball nose end mill, the cutting insert is securely mounted on the tool body through a screw and the like so that it can stably perform cutting tasks. In such a case, since the screw provides the insert with only a vertical clamping force, it cannot sufficiently support the reaction force caused by the cutting force. Particularly, in the cutting insert used for the ball nose end mill having a circular arc-shaped cutting edge for cutting the curved surface, the insert may rotate around the screw due to the reaction force caused by the cutting force. That is, there is a problem in that the cutting insert cannot be securely mounted on the tool body by using only the screw.

FIG. 1 illustrates a ball nose end mill disclosed in Korean Laid-Open Patent Publication No. 10-2002-83423 as an example of the prior art that modifies the mount structure of the cutting insert and the insert pocket in order to solve such a problem. Further, FIG. 2 schematically illustrates the cutting insert shown in FIG. 1.

Referring to FIGS. 1 and 2, a recess 23 formed at a bottom surface 22 of a cutting insert 2 engages with a protrusion 33 formed at a bottom wall 31 of an insert pocket 3. The cutting insert 2 is vertically fixed on the insert pocket 3 by a screw. The engagement between the protrusion 33 and the recess 23 secures the cutting insert 2 on the insert pocket 3 so that the cutting insert 2 cannot rotate.

In the prior art, the cutting insert needs the recess formed at the bottom surface. This is because the cutting insert without the recess may rotate around the screw on the insert pocket while performing cutting tasks. Thus, the prior ball nose end mill uses a single-sided cutting insert, which has cutting edges 25, 26 formed only on one surface of the cutting insert 2.

However, in the conventional single-sided cutting insert, while the first cutting edge 25 performs the cutting tasks, the second cutting edge 26 is inevitably exposed to the outside cutting environment. During the cutting tasks, chips generated by the first cutting edge contact the exposed second cutting edge, thereby causing the second cutting edge to wear out. Thus, there is a problem in that the second cutting edge of the cutting insert for the prior ball nose end mill wears out considerably before it is actually used for performing the cutting tasks. As such, its service life is significantly reduced.

SUMMARY

It is an object of the present invention to provide a milling cutting tool that can securely mount a cutting insert on an insert pocket while improving the service life of the cutting insert, thereby solving the aforementioned problem of the prior art.

A cutting tool according to the present invention includes a tool body and at least one double-sided cutting insert mounted on the tool body. The tool body includes at least one insert pocket for receiving the at least one double-sided cutting insert. The at least one insert pocket includes: a bottom wall; a side wall upwardly extending from the inner side of the bottom wall; a rear wall outwardly extending from the bottom wall and the side wall; and a male coupling portion formed at the rear wall. The at least one double-sided cutting insert includes: an elliptical top surface; an elliptical bottom surface; a pair of side surfaces connecting the top surface with the bottom surface; first and second cutting edges formed between the top surface and a first side surface of the side surfaces and between the bottom surface and a second side surface of the side surfaces, respectively; and a pair of corners formed at ends of the top surface and the bottom surface. The top surface and the bottom surface are 180 degrees rotationally symmetrical about the major axis of the ellipse. One of the corners has a female coupling portion formed therein in order to engage with the male coupling portion of the insert pocket.

Preferably, the cutting tool according to the present invention may be a ball nose end mill.

The double-sided cutting insert according to the present invention may further include a pair of radial support surfaces formed between the top surface and the second side surface and between the bottom surface and the first side surface. The insert pocket may further include a support wall formed on the side wall to engage with one of the radial support surfaces.

Preferably, in the cutting insert of the cutting tool according to the present invention, the angle between the top surface and the first side surface and the angle between the bottom surface and the second side surface are in a range of 65 degrees to 90 degrees.

Preferably, in the cutting insert of the cutting tool according to the present invention, the female coupling portion is generally V-shaped, and particularly the included angle of the V-shape is in a range of 100 degrees to 180 degrees.

According to the present invention, since the cutting insert can be securely clamped, it is prevented from rotating on the insert pocket due to the reaction force caused by the cutting force. Further, while the first cutting edge performs the cutting tasks, the second cutting edge, which does not perform the cutting tasks, does not wear out due to the chips. Thus, the service life of the cutting insert can be improved.

DETAILED DESCRIPTION

The present invention will now be described with reference to the accompanying drawings.

Figure 1:
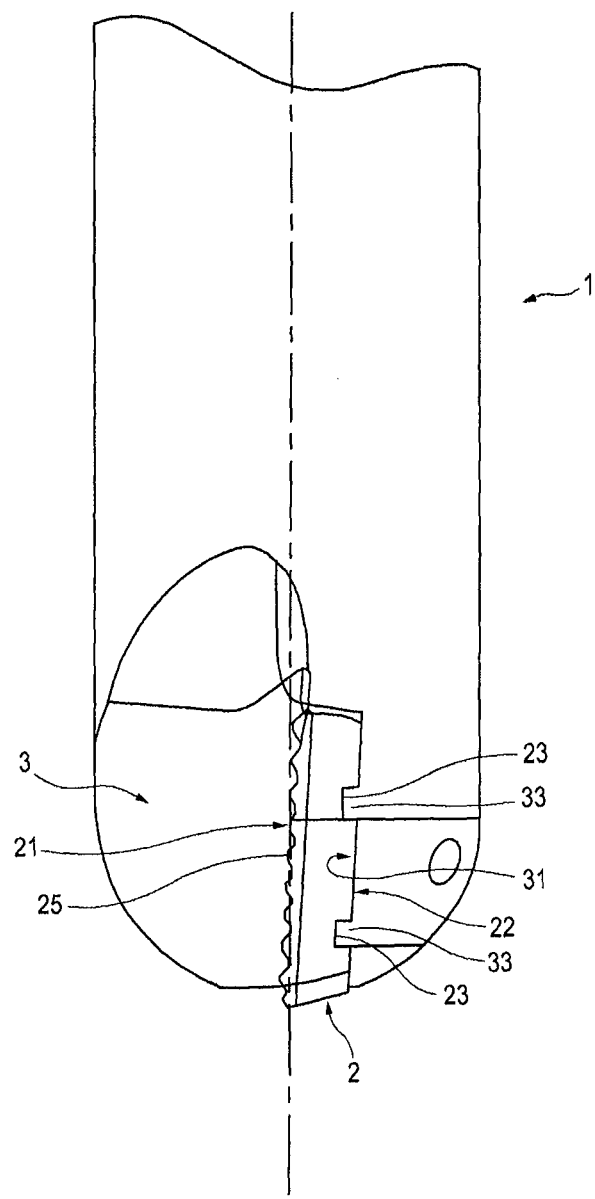
FIG. 1 is a perspective view of a ball nose end mill according to the prior art.
Figure 2:
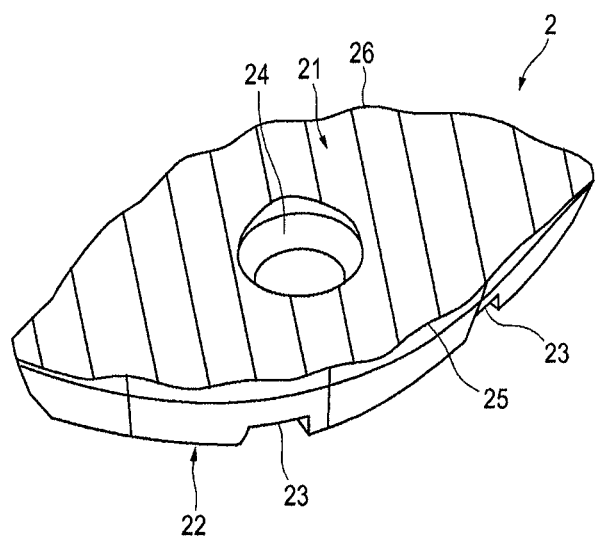
FIG. 2 is a perspective view of a single-sided cutting insert shown in FIG. 1.
Figure 3:
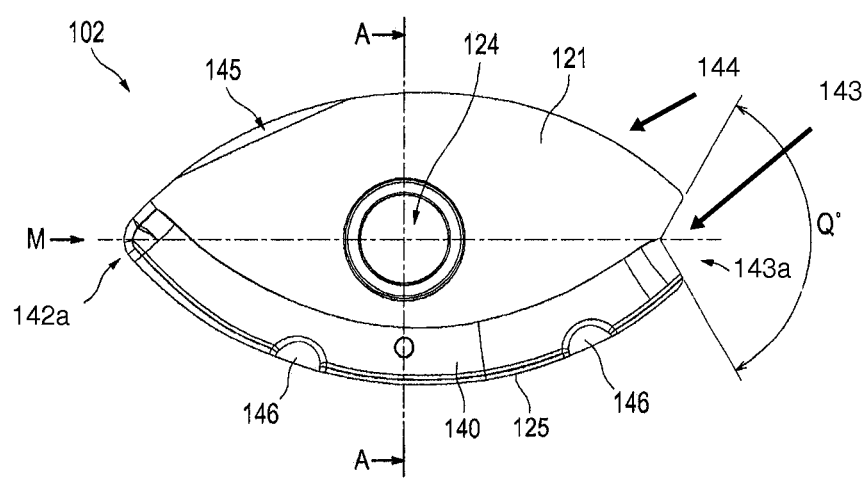
FIG. 3 is a front view of a double-sided cutting insert according to the present invention.
Figure 4:
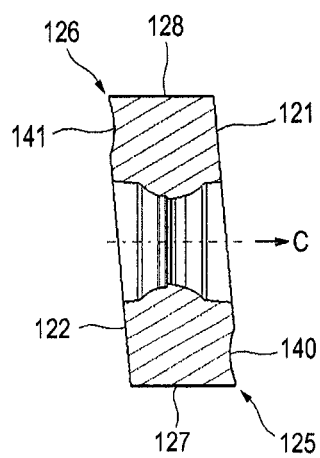
FIG. 4 is a sectional view taken along the line A-A of FIG. 3.
Figure 5:
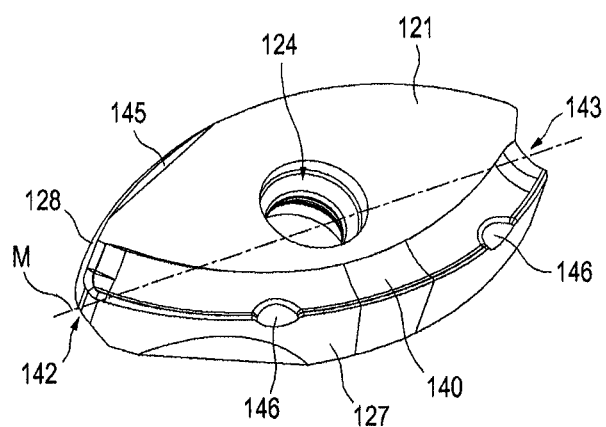
FIG. 5 is a front perspective view of the double-sided cutting insert according to the present invention.
Figure 6:
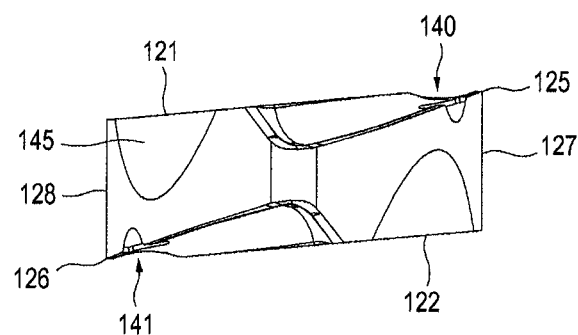
FIG. 6 is a side perspective view of the double-sided cutting insert according to the present invention.

FIG. 3 is a front view of a cutting insert according to the present invention. FIG. 4 is a sectional view of the cutting insert, which is taken along the line A-A of FIG. 3. The cutting insert 102 has an elliptical top surface 121 and an elliptical bottom surface 122. A first side surface 127 and a second side surface 128 connect the top surface 121 with the bottom surface 122. A pair of corners 142a, 143a is formed at ends of the top surface 121 and the bottom surface 122. A first cutting edge 125 having a curved shape is formed at an intersection between the top surface 121 and the first side surface 127. A second cutting edge 126 having a curved shape is formed at an intersection between the bottom surface 122 and the second side surface 128. The first cutting edge 125 and the second cutting edge 126 may be formed only at both the intersection between the top surface 121 and the first side surface 127 and the intersection between the bottom surface 122 and the second side surface 128, respectively. A first chip breaker 140 may be formed between the top surface 121 and the first side surface 127. A second chip breaker 141 may be formed between the bottom surface 122 and the second side surface 128. In such a case, the first cutting edge 125 is formed at an intersection between the first chip breaker 140 and the first side surface 127, while the second cutting edge 126 is formed at an intersection between the second chip breaker 141 and the second side surface 128.

The cutting insert 102 comprises a double-sided cutting insert, wherein the top surface 121 and the bottom surface 122 are 180 degrees rotationally symmetrical about a major axis M of an ellipse. A female coupling portion 143 is concavely formed on one of the pair of the corners 142a, 143a. Further, a pair of radial support surfaces 144, 145 (a radial support surface denoted by 144 is hidden from view but its general location shown in FIG. 3) are formed at the intersection between the top surface 121 and the second side surface 128 and the intersection between the bottom surface 122 and the first side surface 127.

An angle α between the top surface 121 and the first side surface 127 of the cutting insert 102 and an angle α between the bottom surface 122 and the second side surface 128 of the cutting insert 102 are in a range of 65 degrees to 90 degrees.

Further, the female coupling portion 143 of the cutting insert 102 has a V-shape. An included angle Q of the V-shape is in a range of 100 degrees to 180 degrees.

Figure 7:
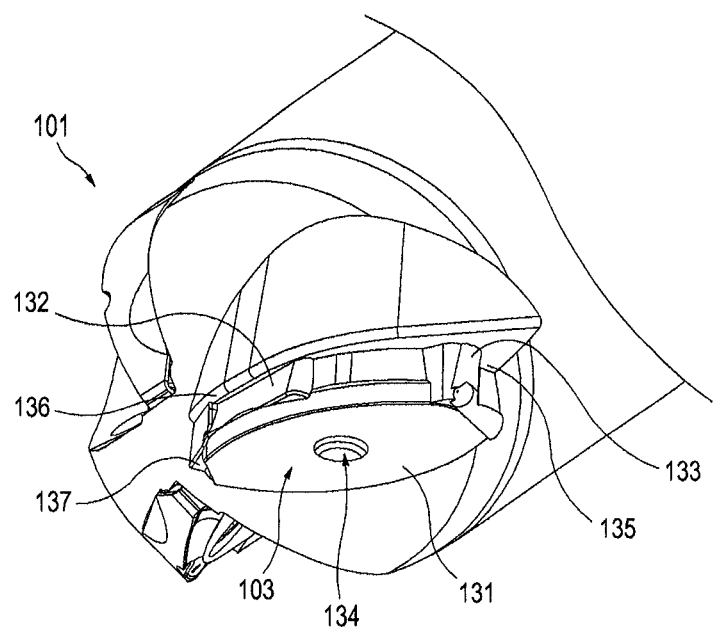
FIG. 7 is a perspective view of an insert pocket of a ball nose end mill according to the present invention.

FIG. 7 is a perspective view of an insert pocket of a ball nose end mill according to the present invention. The insert pocket 103 is disposed at a front side of a tool body 101 and receives the double-sided cutting insert 102. The insert pocket 103 includes the following: a bottom wall 131; a side wall 132 upwardly extending from an inner side of the bottom wall 131; a rear wall 133 outwardly extending from the bottom wall 131 and the side wall 132; and a male coupling portion 135 forwardly protruding from the rear wall 133.

Further, a support wall 136 protrudes from a top end of the side wall 132 of the insert pocket 103. A protrusion 137 is formed at an intersection between a bottom end of the side wall 132 and the bottom wall 131.

Figure 9:
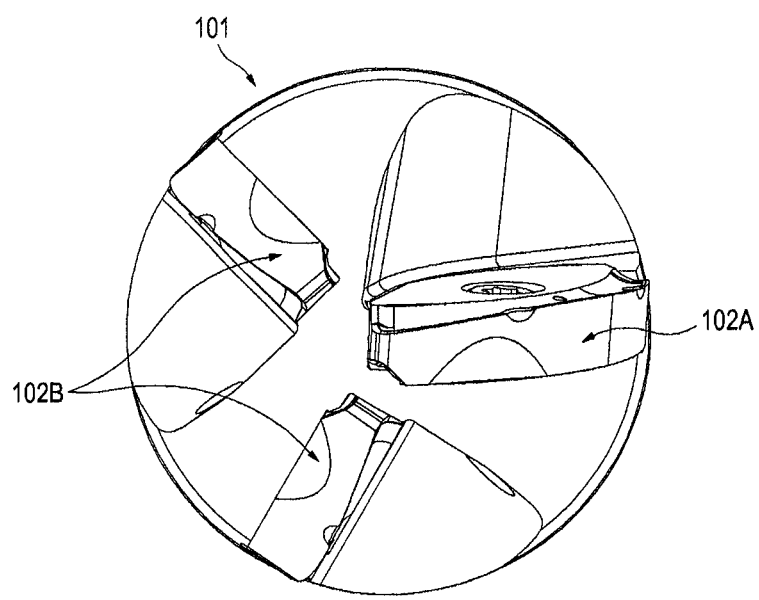
FIG. 9 is a front perspective view of the ball nose end mill according to the present invention.
Figure 10:
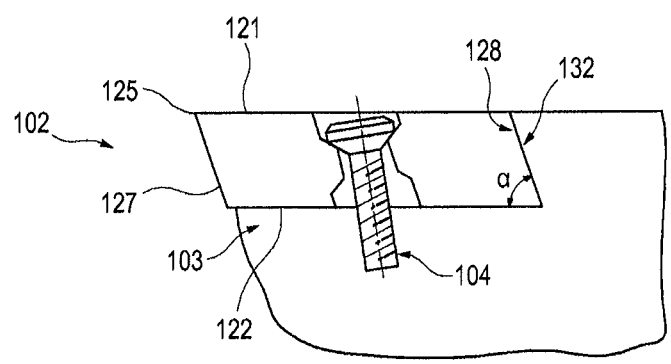
FIG. 10 is a sectional view taken along the line B-B of FIG. 8.

A coupling configuration of the cutting insert and the insert pocket according to the present invention will be described with reference to FIGS. 8 to 10.

Figure 8:
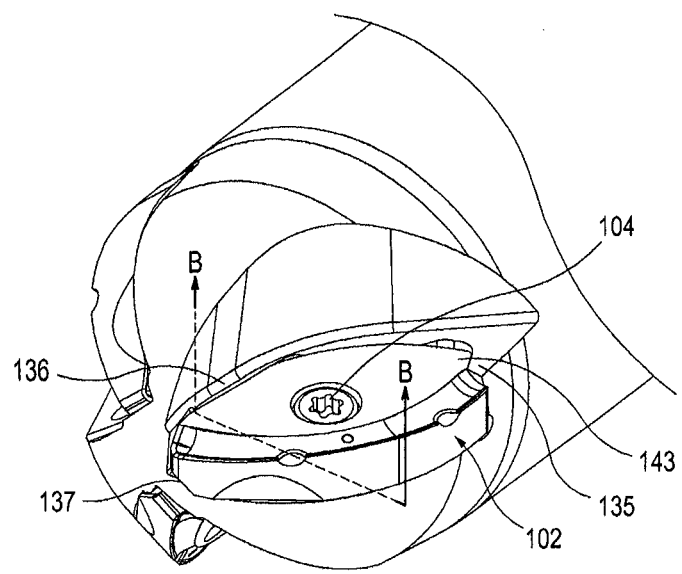
FIG. 8 is a side perspective view of the ball nose end mill according to the present invention.

FIG. 8 is a front perspective view of a ball nose end mill with the cutting insert according to the present invention mounted to the insert pocket. FIG. 9 is a side perspective view of FIG. 8. FIG. 10 is a sectional view taken along the line B-B of FIG. 8. When the cutting insert 102 is mounted to the insert pocket 103 of the tool body 101, the bottom surface 122 of the cutting insert 102 is placed in contact with the bottom wall 131 of the insert pocket 103 and the second side surface 128 of the cutting insert 102 is placed in contact with the side wall 132 of the insert pocket 103. A screw 104 is fastened to a screw bore 134 of the insert pocket 103 through a through bore 124 of the cutting insert 102 to vertically secure the cutting insert 102. The female coupling portion 143 of the cutting insert 102 engages with the male coupling portion 135. The engagement force between the male coupling portion 135 and the female coupling portion 143 can sufficiently support a horizontal reaction force caused by the cutting force, thereby preventing the cutting insert 102 from rotating around the screw 104 on the insert pocket 103 during the cutting tasks. As such, the cutting insert of the present invention does not need to have a recess or protrusion, which is formed on the bottom surface in order to prevent the rotation of the cutting insert 102 in the prior art cutting insert. Accordingly, the bottom surface 122 may have such flat surface as the top surface 121.

The cutting insert of the present invention may have the top surface 121 and the bottom surface 122, which are 180 degrees rotationally symmetrical about the major axis M of an ellipse, unlike the prior art cutting insert. In such a case, since the second cutting edge 126 is located near the bottom end of the side wall 132 of the insert pocket 103 during the cutting tasks using the first cutting edge 125, chips generated by the first cutting edge 125 do not contact the second cutting edge 126. Thus, when the service life of the first cutting edge 125 is over and the cutting insert 102 needs to be mounted upside-down, the second cutting edge 126 remains as originally made. Accordingly, the cutting insert 102 can be used in the cutting tasks for a still longer time than the prior art cutting insert.

That is, according to the cutting insert of the present invention, the cutting insert 102 is prevented from rotating on the insert pocket 103 due to the reaction force caused by the cutting force. Thus, the cutting insert can be securely clamped. Further, while the first cutting edge 125 performs the cutting tasks, the second cutting edge 126, which does not perform the cutting tasks, is not worn out by the chips. Thus, the service life of the cutting insert can be improved.

The cutting insert 102 according to the present invention can be prevented from rotating on the insert pocket 103 by other components. The engagement between one of the radial support surfaces 144, 145 of the cutting insert and the support wall 136 of the insert pocket 103 reinforces the engagement between the male coupling portion 135 and the female coupling portion 143, thereby more securely mounting the cutting insert to the insert pocket. Moreover, as shown in FIG. 10, the angle α between the top surface 121 and the first side surface 127 of the cutting insert 102 as well as the angle α between the bottom surface 122 and the second surface 128 are in the range of 65 degrees to 90 degrees. Also, the side wall 136 of the insert pocket 103 has an inclination angle corresponding to the angles. Thus, a firm dove tail engagement can be made between the radial support surfaces 144, 145 and the support wall 136 of the insert pocket 103.

Further, a gap between the first chip breaker 140 or the second chip breaker 141 of the cutting insert 102 and the protrusion 137 of the insert pocket 103 is minimally maintained, while the radial support surfaces 144, 145 are closely engaged with the support wall 136. This can surely prevent the chips generated by the first cutting edge 125 from entering between the cutting insert 102 and the insert pocket 103. That is, with the above-described arrangement, the second cutting edge 126 can be certainly protected from the chips generated during the cutting process.

While the present invention has been described by way of embodiments thereof, the present invention may be embodied in various manners. For example, as shown in FIG. 9, the cutting tool of the present invention may include one or more cutting inserts. Each of the cutting inserts 102A, 102B may have totally differently shaped cutting edges, partially differently shaped cutting edges or identically shaped cutting edges. Further, the cutting insert of the present invention may be used for a ball nose end mill as well as other cutting tools. These modifications will be obvious to those of ordinary skill in the art and naturally fall within the scope of the present invention.

The invention claimed is:

1. A cutting tool for milling, comprising:
a tool body; and
at least one double-sided cutting insert mounted on the tool body;
wherein the tool body includes at least one insert pocket for receiving the at least one double-sided cutting insert, the at least one insert pocket including a bottom wall, a side wall upwardly extending from an inner side of the bottom wall, a rear wall outwardly extending from the bottom wall and the side wall, and a male coupling portion formed at the rear wall,
wherein the at least one double-sided cutting insert includes an elliptical top surface, an elliptical bottom surface, a pair of side surfaces connecting the top surface with the bottom surface, a first cutting edge formed between the top surface and a first side surface of the pair of side surfaces, a second cutting edge formed between the bottom surface and a second side surface of the pair of side surfaces, and a pair of corners formed at ends of the top surface and the bottom surface, the top surface and the bottom surface being 180 degrees rotationally symmetrical about a major axis (M) of an ellipse which major axis passes though the pair of corners, one of the pair of the corners having a female coupling portion formed therein to engage with the male coupling portion of the insert pocket.

2. The cutting tool of claim 1, wherein the cutting tool is a ball nose end mill.

3. The cutting tool of claim 2, wherein the double-sided cutting insert further includes a pair of radial support surfaces formed between the top surface and the second side surface and between the bottom surface and the first side surface, wherein the insert pocket further includes a support wall formed on the side wall to engage with one of the pair of radial support surfaces.

4. The cutting tool of claim 2, wherein an angle between the top surface and the first side surface and an angle between the bottom surface and the second side surface are in a range of 65 degrees to 90 degrees.

5. The cutting tool of claim 2, wherein the female coupling portion has a V-shape and an included angle of the V-shape is in a range of 100 degrees to 180 degrees.

6. The cutting tool of claim 1, wherein the double-sided cutting insert further includes a pair of radial support surfaces formed between the top surface and the second side surface and between the bottom surface and the first side surface, wherein the insert pocket further includes a support wall formed on the side wall to engage with one of the pair of radial support surfaces.

7. The cutting tool of claim 1, wherein an angle between the top surface and the first side surface and an angle between the bottom surface and the second side surface are in a range of 65 degrees to 90 degrees.

8. The cutting tool of claim 1, wherein the female coupling portion has a V-shape and an included angle of the V-shape is in a range of 100 degrees to 180 degrees.

9. A double-sided cutting insert, comprising:
an elliptical top surface;
an elliptical bottom surface;
a pair of side surfaces connecting the top surface with the bottom surface;
a first cutting edge formed between the top surface and a first side surface of the pair of side surfaces;
a second cutting edge formed between the bottom surface and a second side surface of the pair of side surfaces; and
a pair of corners formed at ends of the top surface and the bottom surface, wherein the top surface and the bottom surface are 180 degrees rotationally symmetrical about a major axis (M) of an ellipse which major axis (M) passes through the pair of corners, one of the pair of corners having a female coupling portion formed therein to engage with a male coupling portion of an insert pocket.

10. The double-sided cutting insert of claim 9, further comprising a pair of radial support surfaces formed between the top surface and the second side surface and between the bottom surface and the first side surface.

11. The double-sided cutting insert of claim 9, wherein an angle between the top surface and the first side surface and an angle between the bottom surface and the second side surface are in a range of 65 degrees to 90 degrees.

12. The double-sided cutting insert of claim 9, wherein the female coupling portion has a V-shape.

13. The double-sided cutting insert of claim 12, wherein the V-shape has an included angle of at least 100 degrees.

14. The double-sided cutting insert of claim 9, wherein:
an angle between the top surface and the first side surface and an angle between the bottom surface and the second side surface are in a range of 65 degrees to 90 degrees;
the female coupling portion has a V-shape; and
the V-shape has an included angle of at least 100 degrees.

15. The double-sided cutting insert of claim 14, further comprising a pair of radial support surfaces formed between the top surface and the second side surface and between the bottom surface and the first side surface.

16. The double-sided cutting insert of claim 9, wherein only one member of the pair of corners has a female coupling portion.

17. The double-sided cutting insert of claim 9, wherein the cutting insert has exactly two cutting edges.

18. The cutting tool of claim 1, wherein only one member of the pair of corners has a female coupling portion.

19. The cutting tool of claim 1, wherein the cutting insert has exactly two cutting edges.

20. A cutting tool for milling, comprising:
a tool body; and at least one double-sided cutting insert mounted on the tool body;

wherein the tool body includes at least one insert pocket for receiving the at least one double-sided cutting insert, the at least one insert pocket including a bottom wall, a side wall upwardly extending from an inner side of the bottom wall, a rear wall outwardly extending from the bottom wall and the side wall, and a male coupling portion formed at the rear wall, wherein the at least one double-sided cutting insert includes an elliptical top surface, an elliptical bottom surface, a pair of side surfaces connecting the top surface with the bottom surface, a first cutting edge formed between the top surface and a first side surface of the pair of side surfaces, a second cutting edge formed between the bottom surface and a second side surface of the pair of side surfaces, and a pair of corners formed at ends of the top surface and the bottom surface, wherein the first cutting edge and the second cutting edge are located opposite each other relative to a major axis (M) of an ellipse which major axis passes though the pair of corners, and wherein only one member of the pair of corners has a female coupling portion formed therein to engage with the male coupling portion of the insert pocket.

21. The cutting tool of claim 20, wherein the cutting insert has exactly two cutting edges.

22. The cutting tool of claim 21, wherein the top surface and the bottom surface are 180 degrees rotationally symmetrical about the major axis (M).

23. A double-sided cutting insert, comprising:
an elliptical top surface;
an elliptical bottom surface;
a pair of side surfaces connecting the top surface with the bottom surface;
a first cutting edge formed between the top surface and a first side surface of the pair of side surfaces;
a second cutting edge formed between the bottom surface and a second side surface of the pair of side surfaces;
a pair of corners formed at ends of the top surface and the bottom surface,
wherein the first cutting edge and the second cutting edge are located opposite each other relative to a major axis (M) of an ellipse which major axis passes though the pair of corners, and
wherein only one member of the pair of corners has a female coupling portion formed therein to engage with a male coupling portion of an insert pocket.

24. The double-sided cutting insert of claim 23, wherein the cutting insert has exactly two cutting edges.

25. The double-sided cutting insert of claim 24, wherein the top surface and the bottom surface are 180 degrees rotationally symmetrical about the major axis (M).

* * * * *